(12) United States Patent
Robertson et al.

(10) Patent No.: US 10,469,125 B2
(45) Date of Patent: Nov. 5, 2019

(54) SLOW HOPPING ANTI-JAM WAVEFORM (SHAW)

(71) Applicant: The Government of the United States of America, as represented by the Secretary of the Navy, Arlington, VA (US)

(72) Inventors: Andrew Robertson, Washington, DC (US); Joseph A. Molnar, Washington, DC (US); Frank Fu, Washington, DC (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 354 days.

(21) Appl. No.: 15/176,739

(22) Filed: Jun. 8, 2016

(65) Prior Publication Data

US 2017/0026075 A1    Jan. 26, 2017

Related U.S. Application Data

(60) Provisional application No. 61/967,066, filed on Jun. 8, 2015.

(51) Int. Cl.
*H04L 29/06* (2006.01)
*H04L 9/32* (2006.01)
(Continued)

(52) U.S. Cl.
CPC .............. *H04B 1/692* (2013.01); *H04B 1/707* (2013.01); *H04B 1/7103* (2013.01); *H04B 1/713* (2013.01); *H04J 13/0062* (2013.01); *H04L 9/12* (2013.01); *H04L 9/3236* (2013.01); *H04L 9/3247* (2013.01); *H04L 9/3297* (2013.01); *H04L 63/18* (2013.01); *H04L 69/28* (2013.01);

(Continued)

(58) Field of Classification Search
CPC .......... H04B 1/692; H04B 1/713–7156; H04B 2201/71361; H04W 12/12; H04W 12/06; H04L 63/18; H04L 63/1466; H04L 9/3247; H04L 69/28; H04L 2209/80; H04L 9/3236–3242; H04J 13/0062
See application file for complete search history.

(56) References Cited

U.S. PATENT DOCUMENTS

| | | | | |
|---|---|---|---|---|
| 4,933,954 A | * | 6/1990 | Petry | ................ H04B 1/713 375/136 |
| 2008/0250243 A1 | * | 10/2008 | Bretheim | ............. H04L 9/3271 713/168 |

(Continued)

*Primary Examiner* — Matthew T Henning
(74) *Attorney, Agent, or Firm* — US Naval Research Laboratory; Richard F. Bis

(57) ABSTRACT

A method of transmitting a message using a slow hopping anti-jam waveform, includes generating a sequence with a cryptographic hash function; transmitting, for a predetermined dwell time, a first portion of the message on a first channel having a first baseline frequency; choosing a second channel having a second baseline frequency based on the generated sequence, the second baseline frequency being offset from the first baseline frequency; and transmitting, for the predetermined dwell time, a second portion of the message on the second channel having the second baseline frequency; wherein the two transmitting steps occur sequentially.

6 Claims, 4 Drawing Sheets

*SHAW Frequency Hopping*

(51) Int. Cl.
*H04J 13/00* (2011.01)
*H04B 1/692* (2011.01)
*H04W 12/12* (2009.01)
*H04B 1/707* (2011.01)
*H04B 1/7103* (2011.01)
*H04B 1/713* (2011.01)
*H04L 9/12* (2006.01)
*H04W 12/06* (2009.01)
*H04W 12/00* (2009.01)

(52) U.S. Cl.
CPC ... *H04W 12/12* (2013.01); *H04B 2201/71361* (2013.01); *H04L 63/1466* (2013.01); *H04L 2209/80* (2013.01); *H04W 12/00502* (2019.01); *H04W 12/06* (2013.01)

(56) References Cited

U.S. PATENT DOCUMENTS

| | | | | |
|---|---|---|---|---|
| 2013/0243038 | A1* | 9/2013 | Rasband | H04W 8/005 375/133 |
| 2015/0186642 | A1* | 7/2015 | Cruz Mota | G06F 21/554 726/23 |
| 2016/0248515 | A1* | 8/2016 | Zheng | H04J 14/06 |
| 2016/0262123 | A1* | 9/2016 | Abedini | H04W 56/0015 |

* cited by examiner

SLOW HOPPING ANTI-JAM WAVEFORM (SHAW)

RELATED APPLICATIONS

This application claims the benefit of U.S. Provisional Application No. 61/967,066 filed Jun. 8, 2015, which is hereby incorporated herein by reference.

FIELD OF INVENTION

The present invention relates generally to wireless tactical communications that are resilient to hostile jamming, and more particularly to cryptographically determinate slow hopping anti-jam wireless communications.

BACKGROUND

The Anti-Access/Area Denial (A2AD) strategy is an effort on the part of US adversaries to deny freedom of movement to US forces. Methods include offensive cyber operations, attacks against space navigation and communications platforms, maritime missile and mine deployments, and electronic warfare. The strategic goal is to keep US forces out of areas where they would otherwise be politically and militarily relevant, and a primary facilitator of that goal is to degrade or deny the wireless communications on which command and control depend.

Wireless communications in A2AD scenarios represent a difficult challenge. Data must be communicated over distances on the order of 800 nm to keep large, high value assets out of enemy missile range. Mobile platforms with lower radar cross-sections (especially unmanned platforms) that can move into the denied perimeter must have uninterrupted communications with assets outside. As satellite waveforms are susceptible to jamming and the satellites themselves are vulnerable to space-based attacks. It is assumed that satellite communications will be denied. Over such long distances, even reliable point-to-point links using HF and VHF are difficult. These problems are partially answered by aerial layer networking, but air platforms high exposure necessitates a robust physical waveform not only for data links but for platform C2. This waveform must be particularly resilient against swept, partial-band, and narrow-band interference. The low density of assets and the desire for their undetectability implies directional waveforms will be most useful. There appears a need for a wideband, low instantaneous bandwidth, directional waveform.

Anti-jam communications use hybrids of frequency-hopping spread spectrum (FHSS) and direct-sequence spread spectrum (DSSS). In both cases, the idea is to widen the bandwidth of the communications waveform such that narrow-band jamming is only effective against a small portion of the waveform. The unaffected portions can still be used to communicate data. The hop sets are confined to a few hundred megahertz because changing the carrier frequency by amounts on the order of GHz takes more time as one must wait for oscillator transients to suppress. This compromises data-rate. Similarly DSSS systems are confined to similar bandwidths because they cannot occupy non-contiguous bands in frequency space and because their bandwidth is limited by the speed of the analogue-to-digital converters (ADC) in their receivers. In either case, the conventional operational anti-jam waveform looks continuous in frequency space over a bandwidth of a few hundred MHz (once time-averaged).

SUMMARY OF INVENTION

There are a number of vulnerabilities to conventional waveforms that a hostile electronic attack (EA) could exploit. The first is that the waveform (albeit wide) bandwidth is confined to a single contiguous set of spectrum. A jammer can employ partial band jamming (PBJ) which simply jams a large enough portion of the communications waveform to cause an unacceptable number of errors. Faster jammers can attack FHSS systems by listening to where they hop and then moving to interfere only in the instantaneous channel of the present dwell. This is a very efficient attack in terms of the amount of power that the jammer must emit. Another method is to quickly sweep a waveform through every frequency in the communications band, and still another is to prevent the radios from executing the synchronization procedure necessary to align their dwells so that they are all hopping frequencies at the correct times. All of these vulnerabilities fundamentally stem from the 100 MHz average bandwidth that communications waveforms typically have.

However one cannot simply increase the bandwidth of the communications waveform. The Federal Communications Commission (FCC) and Defense Information Systems Agency (DISA) place rigid limits on the bands that wireless waveforms can use. Wider bandwidths also require faster ADC's that increase the cost and complexity of the platforms that use them. What is really desired is a network that hops over very wide bandwidths but uses hop sets that are non-contiguous. Over such large bands full of other signals, a jammer cannot sense or follow the communications hopper. It cannot place any meaningful partial band jamming not only because the energy required would be prohibitively large but for regulatory reasons also.

Therefore, embodiments in accordance with the present disclosure enable moderate data-rate applications such as elastic data transmission and voice communications that are resistant to electronic attack and spoofing. Potential applications include protected SATCOM, cooperative RADAR, cooperative electronic warfare, covert communications, and wireless guidance of munitions, for example.

According to one aspect of the invention, a method of transmitting a message using a slow hopping anti-jam waveform, includes generating a sequence with a cryptographic hash function; transmitting, for a predetermined dwell time, a first portion of the message on a first channel having a first baseline frequency; choosing a second channel having a second baseline frequency based on the generated sequence, the second baseline frequency being offset from the first baseline frequency; and transmitting, for the predetermined dwell time, a second portion of the message on the second channel having the second baseline frequency; wherein the two transmitting steps occur sequentially.

Optionally, the predetermined dwell time is chosen to be longer than an amount of time for oscillator transients to suppress.

Optionally, the method includes transmitting a resynch pulse for cold rendezvous.

Optionally, transmitting the resynch pulse includes a Chu sequence for precise timing, a sender's time-stamp at which the Chu sequence was sent, a random number generated by a sync node for each packet, and a verification portion.

Optionally, the verification portion includes a digital signature signing the time-stamp with a mission authentication key.

Optionally, the verification portion includes an encrypted authentication function.

Optionally, the predetermined dwell time is approximately 0.1 seconds.

Optionally, the steps of transmitting include modulating the transmission via direct-sequence spread spectrum modulation.

According to another embodiment, a method of performing a warm rendezvous of a node with a network that is utilizing a slow hopping anti-jam waveform, includes generating a sequence with a cryptographic hash function; determining a channel frequency that the network will be utilizing in the future based on the generated sequence, the current time of the node, and a predetermined time increment, $\Delta t$; and listening for a resynch signal at the determined channel frequency for the predetermined time increment.

Optionally, the method includes authenticating a received resynch signal via cryptographic proof.

Optionally, the method includes determining that warm rendezvous has failed when the resynch signal is not received within the predetermined time increment.

Optionally, the predetermined time increment is less than one second.

According to another embodiment, a method of performing a cold rendezvous of a node with a network that is utilizing a slow hopping anti-jam waveform, includes determining a random channel frequency that the network will be utilizing in the future; listening for a resynch signal at the determined random channel frequency; authenticating a received resynch signal via cryptographic proof; and after authenticating, updating a node clock based on the received resynch signal.

The foregoing and other features of the invention are hereinafter described in greater detail with reference to the accompanying drawings.

DETAILED DESCRIPTION

Figure 1:
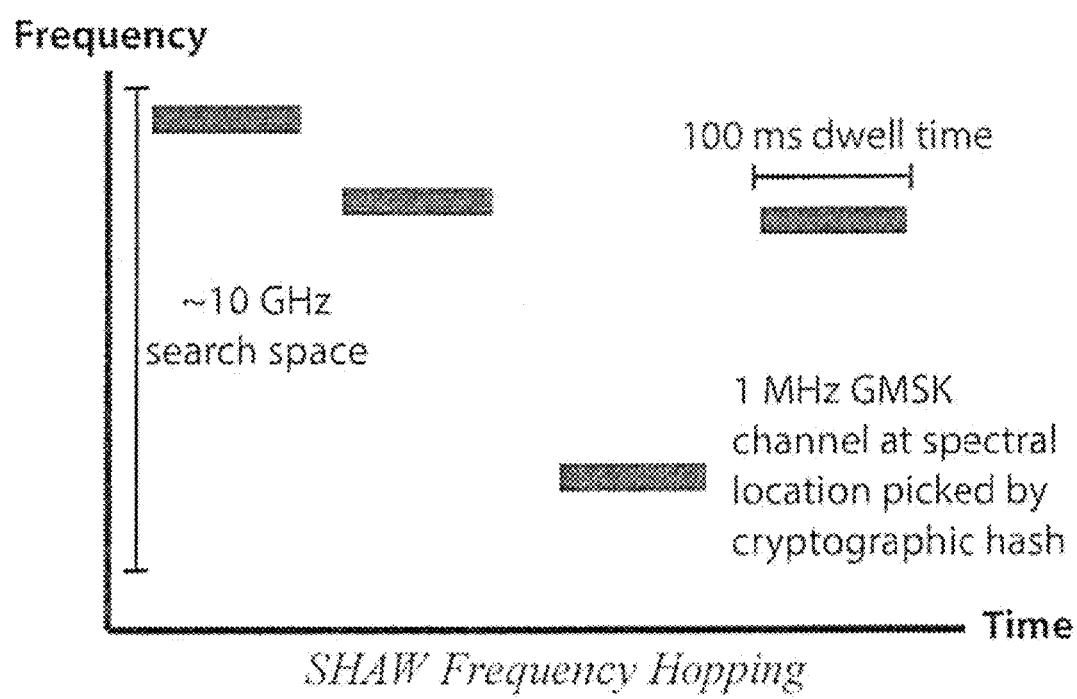
FIG. 1 shows a depiction of the bandwidth use of the SHAW algorithm on a plot of frequency vs. time.

Referring first to FIG. 1, presented herein is a frequency hopping protocol that hops over multiple GHz while only using about 20 MHz total. It hops in an unpredictable fashion, and its instantaneous channel width is less than 5 MHz. When a node joins or is cut-off from the network, it (re)synchronizes via two mechanisms that use cryptographic authentication and encryption in order to be difficult to jam or spoof. The waveform may dwell for approximately 0.1 seconds; long enough that oscillator transients die out but too short for a jammer to search through multiple GHz of spectrum.

It is very difficult for a single jammer to sense such large bandwidths (multiple GHz) let alone to jam them. The jammer's difficulty is aggravated if the bands are full of other signals that the jammer is not supposed to attack or if DSSS is overlaid upon the slow hopping anti-jam waveform (SHAW) protocol. By dwelling longer than a conventional frequency hopper, SHAW can hop over much larger bandwidths because it has time for the transceiver transients in oscillators and other components to die out. So long as the dwell time is shorter than the typical time for a jammer to sense and prosecute a small signal (kHz to 10 MHz) over a bandwidth spanning multiple GHz, the signal will have moved to the next channel by the time the jammer attacks.

The jammer can improve the odds of successful jamming if the hopping sequence can be predicted before it is implemented. Many frequency hoppers use sequences that repeat because this makes resynchronization easier; a radio need only search through delay space proportional to the period of the repeating sequence. Unfortunately, this allows a jammer to slowly learn the sequence and then exploit it. SHAW precludes this by using a sequence generated by a cryptographic hash function: $m=F_M(i,K)$. A channel index m between 1 and M is chosen based on an integer i and a secret mission key K. The integer i is the index of the present time-slot. Although a jammer knows the time as well or better than any node in the network and perhaps knows the slot index, the jammer does not know the secret key and thus cannot calculate the hop sequence. The jammer cannot even make statistical predictions about future hops based on past hops. To the jammer, the hop sequence is simply a random process picking channels uniformly.

In order for this protocol to allow for communication, nodes in the system will need to synchronize. If a node desynchronizes by more than a certain threshold, the node would be putting the wrong integer i into the function and therefore would be on different channels from the rest of the network. Since no clocks remain perfectly synchronized, a synchronization procedure that does not rely on the hopping sequence is provided.

It is common for jammers to attack synchronization procedures in conventional frequency hopping implementations. SHAW mitigates this threat by having lost nodes resynchronize to designated sync nodes by one of two methods—warm and cold rendezvous.

Figure 2:
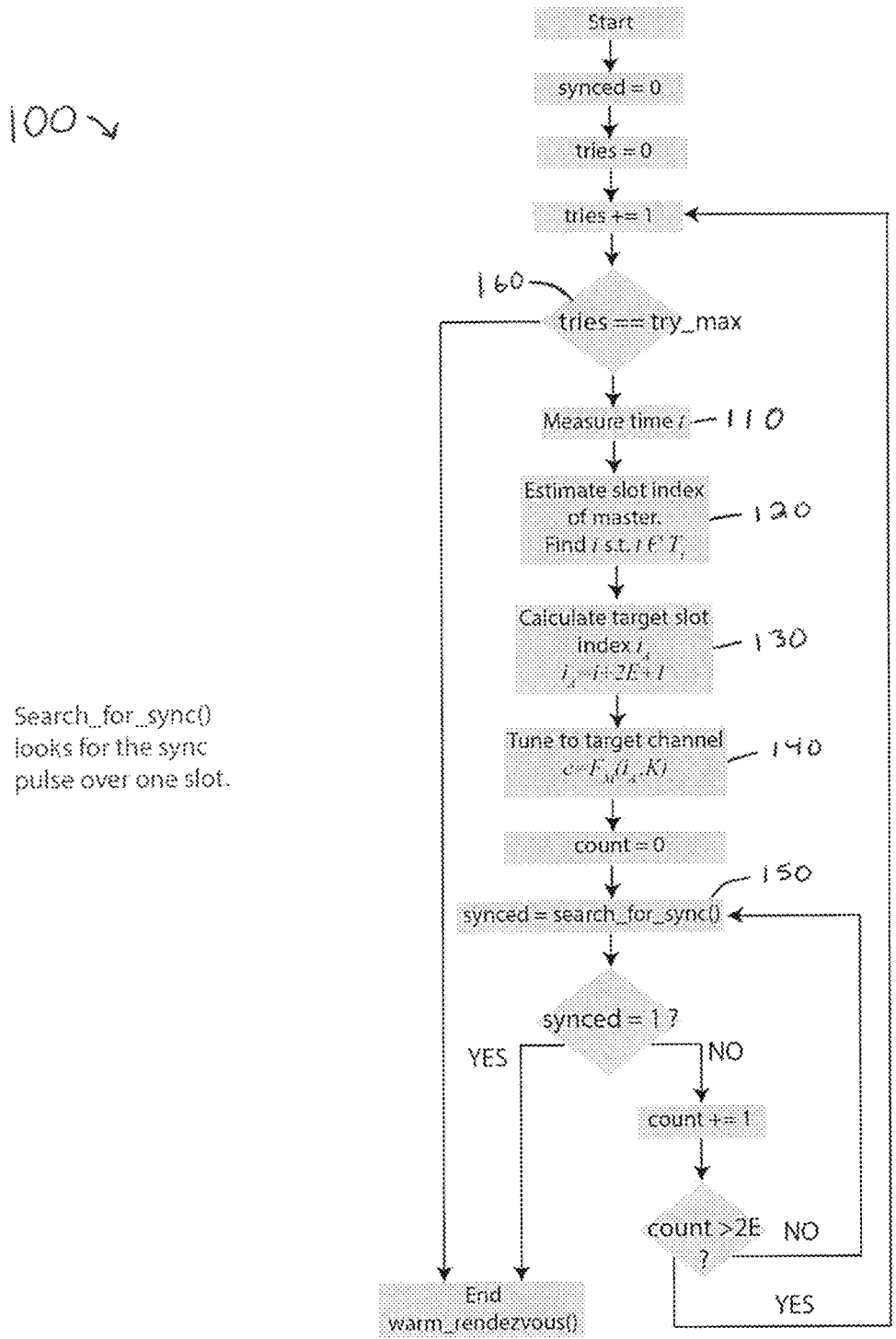
FIG. 2 shows a block diagram of the warm rendezvous algorithm.
Figure 3:
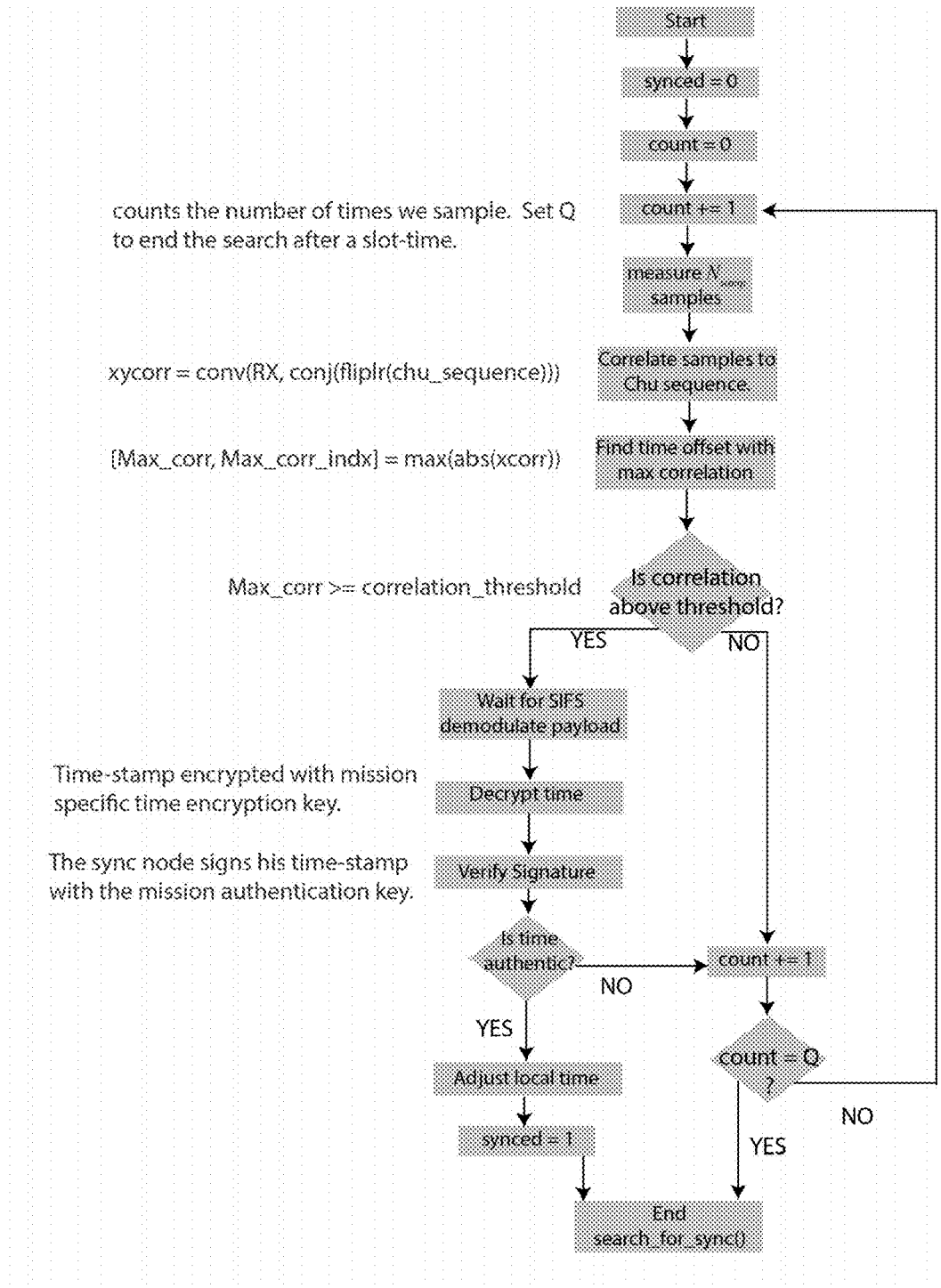
FIG. 3 shows a block diagram of the search for sync algorithm.

Referring now to FIGS. 2 and 3, warm rendezvous assumes that the radio trying to resync is not desynchronized from the sync node by more than $\Delta t$. The node merely plots where the network will be in spectrum space at some time later than $\Delta t$ from present and waits there for the resync signal from the sync node. Since normal quartz watches will drift about 0.1 seconds in a day, assuming no more than 1 second desynchronization is plenty generous for even the most inexpensive components. Thus $\Delta t$ need not be longer than a second and resynchronization should occur within that time. Again the jammer cannot predict where this resync will occur, so the jammer will have to be very lucky to guess where the resync will happen and jam there. The jammer would have to be impossibly lucky to do this multiple times.

Therefore, in order to perform a warm rendezvous 100, a node would measure the current time of the node at box 110. Next, the node would estimate the slot index of the network at 120 based on the current time of the node. Next, the node would calculate the target slot index at block 130, based on the estimated slot index of the system and $\Delta t$. Next, the node would determine and tune to a channel frequency that the network will be using in the future at block 140, based on a sequence generated with a cryptographic hash function. At block 150, the node will listen for a resynch signal for the predetermined time increment.

If no resynch signal is received, at block 160, once the predetermined time increment has passed, the node will determine that the warm rendezvous has failed.

FIG. 3 details how the node listens for and verifies a resynch signal.

Figure 4:
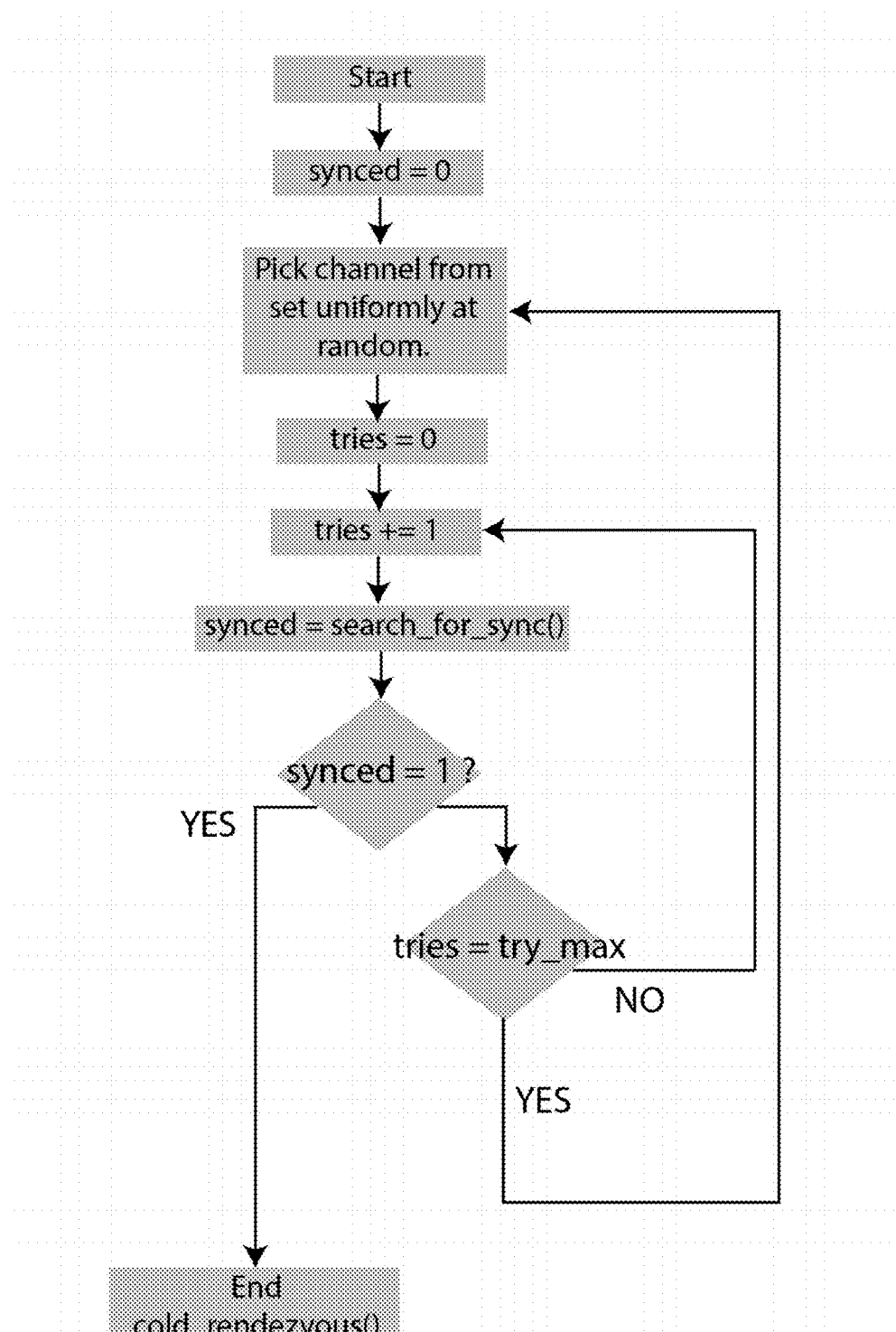
FIG. 4 shows a block diagram of the cold rendezvous algorithm.

If a warm rendezvous fails, or if the node is otherwise programmed to forego a warm rendezvous, a node may attempt a cold rendezvous, as illustrated in FIG. 4.

A cold rendezvous assumes the worst case that a radio has the secret key but has been desynchronized by more than $\Delta t$. The radio has lost the network, and there is an equal chance of the sync node being on any frequency in the hop set. However a node can exploit the uniformity of the function $F_M$. Because it is indistinguishable from a uniform random process over the set of possible channels, the cold synchronizing node need only wait at a randomly chosen channel. The sync node is guaranteed to eventually transmit the sync pulse on that channel in an average time proportional to the number of channels. For 100 channels, this average time is 10 seconds. As with warm rendezvous, the jammer does not know where resync will occur and cannot prevent it indefinitely.

The randomness of the hop sequence prevents the enemy from jamming resynchronization, so the enemy may try to spoof it instead. SHAW prevents this by authenticating the resync pulse sent by the sync node/network. The pulse consists of a Chu sequence for precise timing, a sender's time-stamp at which the Chu sequence was sent, a random number generated by the sync node for each packet, and a digital signature signing the time-stamp with the mission authentication key (which should be different from K). An encrypted authentication (EA) function can be substituted for the digital signature if processing time is a worry. In either case, the jammer will not know the authentication key and cannot forge sync pulses. Furthermore the resyncing node does not respond to the sync pulse. Rather, it just updates its time and starts hopping with the network again. Thus, the jammer cannot even be sure that someone is listening when he tries to spoof.

A Chu sequence is a complex-valued mathematical sequence which, when applied to radio signals, gives rise to an electromagnetic signal of constant amplitude, whereby cyclically shifted versions of the sequence imposed on a signal result in zero correlation with one another at the receiver. By assigning orthogonal Chu sequences to each node and multiplying their transmissions by their respective codes, the cross-correlation of simultaneous node transmissions is reduced, thus reducing inter-node interference and uniquely identifying node transmissions.

These algorithms have been implemented on a testbed of two universal software radio peripherals (USRP's). An examplary hop set included 20 channels with 100 MHz spacing from 1 GHz to 3 GHz. The dwell time was 100 ms with 10 ms guard times at the ends and beginnings of hops. The network consisted of a single wired link between a server and a client. The server acted as the sync node and sent synchronization pulses which were authenticated using a cipher-based message authentication code (CMAC). During the runs, the operating system clocks were able to maintain synchronization within 4.0 ms which was more than enough to maintain synchronization of the hopping sequences.

This system has a number of advantages over previous anti-jam frequency hopping schemes. The first is the multiple GHz bandwidth that offers the majority of the electronic protection from jammers. This bandwidth is much higher than those of other frequency hoppers, and it is possible because of the long dwell time. The long dwell time is also the reason why the protocol can be implemented on such cheap hardware. The USRP's on which the algorithm has been successfully tested cost only $1717.00 as opposed to much costlier gear necessary to implement other wideband hopping schemes. The resynchronization procedures are also a major selling point of the protocol. They are difficult to spoof due to the cryptographic authentication, and they have short rendezvous times as compared to conventional systems.

A modification to the basic SHAW methods provided above is to use SHAW for higher rate data communication and put it on a more advanced radio than a USRP. The long dwell time of 0.1 seconds accommodates the USRP hardware, but a better radio could have an even shorter dwell-time and make jamming much more difficult. Faster ADC's could increase the data-rate to the point where it could support advanced applications. SHAW could further be enhanced to support multiple links and cluster-based synchronization to support ad hoc networking.

Depending on the scenario into which SHAW is deployed, other alternative modes of operation present themselves. For example, DSSS or some other spreading technique could be implemented over SHAW so that, in addition to being frequency hopped over a wide bandwidth, the power spectral density of the waveform would be beneath the noise floor. This would make the detection of SHAW all but impossible because the jammer would have to contend not only with a very large search space (GHz of potential bandwidth) but also with a very weak signal to detect. This is difficult to implement on a USRP, but specialized hardware would be capable of this implementation.

Another embodiment would include changing the hop set according to the time. In exemplary embodiments previously described the hopper changes its channel often, but the hop set remains static. In this alternative embodiment, the hop set could be changed so that jammers could not figure it out over time. This prevents jammers from targeting the hop set even if they can attack large non-contiguous bandwidths. The cold rendezvous protocol would have to be modified, as would be understood by one having ordinary skill in the art after reading and understanding this disclosure, to change its hop set accordingly.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method of transmitting a message using a slow hopping anti-jam waveform, the method comprising the steps of:
   generating a sequence with a cryptographic hash function;
   transmitting, for a predetermined dwell time, a first portion of the message on a first channel having a first baseline frequency;

choosing a second channel having a second baseline frequency based on the generated sequence, the second baseline frequency being offset from the first baseline frequency;

transmitting, for the predetermined dwell time, a second portion of the message on the second channel having the second baseline frequency; and transmitting a resynch pulse for cold rendezvous wherein the two transmitting, for a predetermined dwell time, steps occur sequentially, and wherein transmitting the resynch pulse includes a Chu sequence for precise timing, a senders time-stamp at which the Chu sequence was sent, a random number generated by a sync node for each packet, and a verification portion.

2. The method of claim 1, wherein the predetermined dwell time is chosen to be longer than an amount of time for oscillator transients to suppress.

3. The method of claim 1, wherein the verification portion includes a digital signature signing the time-stamp with a mission authentication key.

4. The method of claim 1, wherein the verification portion includes an encrypted authentication function.

5. The method of claim 1, wherein the predetermined dwell time is approximately 0.1 seconds.

6. The method of claim 1, wherein the steps of transmitting, for a predetermined dwell time, include modulating the transmission via direct-sequence spread spectrum modulation.

* * * * *